United States Patent Office 3,232,838
Patented Feb. 1, 1966

3,232,838
HEPARIN DERIVATIVES AND METHODS FOR PREPARING SAME
Gérard Nominé, Noisy-le-Sec, and Robert Bucourt, Clichy-sous-Bois, France, assignors to Roussel-Uclaf, S.A., Paris, France, a corporation of France
No Drawing. Filed July 24, 1963, Ser. No. 297,239
Claims priority, application France, July 27, 1962, 905,336
19 Claims. (Cl. 167—74)

The invention relates to the novel compounds, N-(mono or di-sulfobenzoyl)-N-desulfoheparins and their alkali metal salts, and to a novel process for preparing the novel compounds. The invention also relates to novel anti-coagulant compositions and to a method of preventing the coagulation of blood.

Heparin is a known compound which possesses anti-lipemic and anti-coagulant activity. Various derivatives of heparin are also known which possess a strong anti-lipemic activity with a minimum of anti-coagulant activity. U.S. Patent No. 3,065,140 describes N-acylated derivatives of N-desulfoheparin, such as N-benzoyl-N-desulfoheparin, N-p-nitro-benzoyl-N-desulfoheparin and N-3,5-dimethylbenzoyl-N-desulfoheparin which have a lower anti-coagulant activity than heparin. U.S. Patent No. 3,033,751 describes substituted heparylurea derivatives prepared from N-desulfoheparin, such as n-butyl heparylurea, phenyl heparylurea and α-naphthyl heparlurea which possess a greater ratio of antilipemic activity to anti-coagulant activity than heparin. The compounds of the invention possess a clear, more prolonged anti-coagulant activity than heparin.

It is an object of the invention to provide novel N-(sulfobenzoyl)-N-desulfoheparins and their alkali metal salts.

It is another object of the invention to provide a novel process for the preparation of N-(sulfobenzoyl)-N-desulfoheparins and their alkali metal salts.

It is another object of the invention to provide novel anti-coagulant compositions having a prolonged activity.

It is a further object of the invention to provide a novel method of preventing the coagulation of blood.

These and other objects and advantages of the invention will become obvious from the following detailed description.

The novel compounds of the invention are N-(mono- and di-sulfobenzoyl)-N-desulfoheparins and their alkali metal salts which have the probable structural formula

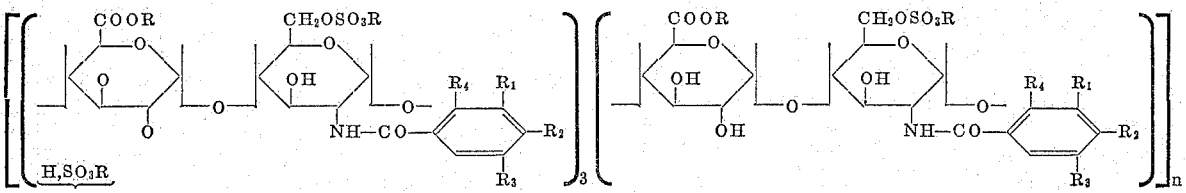

wherein R is selected from the group consisting of hydrogen and an alkali metal and 1 to 2 of $R_1$, $R_2$, $R_3$ and $R_4$ are sulfonic acid groups in the free or alkali metal salt form and the rest of $R_1$, $R_2$, $R_3$ and $R_4$ being hydrogen and $n$ is about 10.

The novel process of the invention for the preparation of N-(mono- and di-sulfobenzoyl)-N-desulfoheparin comprises reacting N-desulfoheparin with a high molecular weight quaternary ammonium salt to form the corresponding quaternary ammonium salt of N-desulfoheparin, reacting the latter with an acid anhydride selected from the group consisting of an anhydride of a mono-sulfobenzoic acid, an anhydride of a di-sulfobenzoic acid, a mixed anhydride of a mono-sulfobenzoic acid and a lower alkanoic acid and a mixed anhydride of a di-sulfobenzoic acid and a lower alkanoic acid to form the corresponding N-(sulfobenzoyl)-N-desulfoheparin which may be recovered or reacted with an alkali metal salt of a lower alkanoic acid to form the corresponding alkali metal salt of the N-(sulfobenzoyl)-N-desulfoheparin.

The high molecular weight quaternary ammonium salts which are reacted with the N-desulfoheparin are known. Examples of suitable salts are Hyamine 2389 which is a trimethyl (methyl dodecyl benzyl) ammonium chloride, Arquad 2C which is dilauryl dimethyl ammonium chloride, and preferably Hyamine 1622 which is benzyldimethyl - 2 - [2-(p-1,1,3,3-tetramethyl butyl-phenoxy)-ethoxy] ethyl ammonium chloride.

Examples of suitable anhydrides and mixed anhydrides of the sulfobenzoic acids useful in the process are o-sulfobenzoic acid anhydride, 2,4-disulfobenzoic acid anhydride, the mixed anhydride of 3,5-disulfobenzoic acid and ethoxy carbonic acid and the mixed anhydride of m-sulfobenzoic acid and ethoxycarbonic acid.

The novel anti-coagulant compositions of the invention are comprised of a compound selected from the group consisting of N-(mono- and di-sulfobenzoyl)-N-desulfoheparins and their alkali metal salts and a major amount of a pharmacological carrier, preferably a liquid injectable carrier. The compositions possess a clear, prolonged anti-coagulant activity which lasts for a period of 6 to 10 hours from the time of administration.

The N-(mono- and di-sulfobenzoyl)-N-desulfoheparins of the invention have a more prolonged period of activity than heparin and avoids the repeated intravenous injections or continuous venous perfusions required for very high doses of heparin. They also act with more rapidity for a well determined period of time than anti-coagulant derivatives of dicoumarine which inhibit the synthesis of thrombin in the liver (antagonists of vitamin K) and, therefore, have a retarding activity but whose duration cannot be absolutely determined beforehand. Moreover, the activity of the compounds of the invention occurs in all stages of coagulation and, therefore, their anti-coagulant activity is more certain and less dangerous for the organism.

The novel method of preventing the coagulation of blood comprises intravenously administering an effective amount of a compound selected from the group consisting of N-(mono- and di-sulfobenzoyl)-N-desulfoheparin. The usual useful dosage is 400 mg. to 2 gm. per day depending on the method of administration.

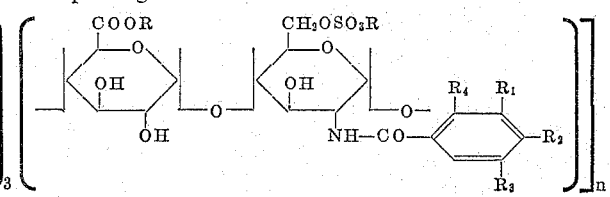

In the following examples there are described several preferred embodiments to illustrate the invention. However, it is to be understood that the invention is not intended to be limited to the specific embodiments.

EXAMPLE I

*Preparation of the sodium salt of N-(2-sulfobenzoyl)-N-desulfoheparin*

9.07 g. of N-desulfoheparin were introduced into 50 cc. of water and then 250 cc. of an aqueous solution containing 10% of Hyamine 1622 were added. The precipitate formed was homogenized and after the reaction mixture was allowed to remain at rest for a period of about one hour, it was vacuum filtered and the precipitate washed with water. 28.5 g. of the Hyamine salt of N-desulfoheparin were obtained which was used as such for the following step of the synthesis.

3 g. of the said Hyamine salt were introduced under agitation into 60 cc. of tetrahydrofuran and agitated until solution occurred. Then, successively and under agitation, 3 cc. of triethylamine and 1.5 g. of o-sulfobenzoic acid anhydride were added. The agitation was continued for a period of 15 hours at room temperature and the solution was then evaporated to dryness under vacuum. The residue was taken up with 30 cc. of aqueous n-butanol and the n-butanol solution was extracted several times with a 20% solution of sodium acetate. The combined extracts were filtered and after the filtrate was poured into methanol, the solution was allowed to stand at rest for a period of one hour. The precipitate formed was vacuum filtered, washed with methanol and dried to obtain 1.047 g. of the sodium salt of N-(2-sulfobenzoyl)-N-desulfoheparin.

*U.V. spectra.*—(N/10 hydrochloric acid) absorption at 266 and 272 m$\mu$ corresponding to $1.3$–$1.4 \times 10^{-3}$ mols of o-sulfobenzoic acid per gram.

This product was soluble in water and insoluble in alcohol, ether, acetone, benzene and chloroform. Dilute aqueous acids hydrolyzed it and dilute aqueous alkalis degraded it.

*Analysis.*—$(C_{76}H_{77}O_{77}N_4S_{11}Na_{15})_n = (2,976.12)_n$. Calculated: S, 11.85%. Found: 11.4.

*Anticoagulant activity.*—$36.5 \pm 1.5$ ATU (anti-thrombic units)/mg.

This compound is not described in the literature.

EXAMPLE II

*Preparation of the sodium salt of N-(2,4-disulfobenzoyl)-N-desulfoheparin*

STEP A.—PREPARATION OF THE HYAMINE 1622 SALT OF N-DESULFOHEPARIN 17.88 g. of the potassium salt of N-desulfoheparin were dissolved in 100 cc. of water and then 500 cc. of an aqueous solution of 10% Hyamine 1622 was added thereto. The reaction mixture was homogenized and then allowed to stand at rest for a period of about 1 to 2 hours. The precipitate formed was vacuum filtered, washed in water and dried under vacuum to obtain 56 g. of the Hyamine 1622 salt of N-desulfoheparin (compound A).

STEP B.—PREPARATION OF HYAMINE 1622 SALT OF THE ANHYDRIDE OF 2,4-DISULFOBENZOIC ACID 70 g. of the sodium salt of 2,4-disulfobenzoic acid were dissolved in 700 cc. of water and 70 cc. of formic acid and then 1,550 cc. of an aqueous solution of 10% Hyamine 1622 were added. The resulting solution was extracted several times with methylene chloride. The extracts were combined and evaporated, water was removed by entrainment with benzene. The dry residue was taken up with 700 cc. of trichloroethylene and the mixture was heated to reflux until solution occurred. Then the solution was allowed to cool to 50° to 60° C. and 105 cc. of thionyl chloride was introduced under agitation. The agitation was continued for about 2 hours at a temperature situated between 75 and 80° C. Then distillation of the solution was started under normal pressure, and continued under vacuum until there remained only traces of thionyl chloride in the mixture. The residue was taken up with 700 cc. of tetrahydrofuran and the resulting solution was treated with animal carbon black, filtered and a tetrahydrofuran solution of the Hyamine 1622 salt of the anhydride of 2,4-disulfobenzoic acid (compound B) was obtained which was used as such for the following step of the synthesis.

STEP C.—PREPARATION OF THE SODIUM SALT OF N-(2,4-DISULFOBENZOYL)-N-DESULFOHEPARIN 49 g. of the Hyamine 1622 salt of N-desulfoheparin (A) were introduced under agitation in 1000 cc. of tetrahydrofuran and after solution occurred at room temperature, solution B prepared in Step B was added, and the reaction mixture was subjected to agitation for a period of about 17 hours at room temperature. Then the reaction mixture was evaporated to dryness under vacuum at temperatures below 50° C. The residue was taken up with 500 cc. of aqueous n-butanol and extracted several times with a 20% aqueous solution of sodium acetate. The extracts were combined, filtered, and 750 cc. of methanol were added thereto. The mixture was allowed to stand for about 1 to 2 hours and the precipitate formed was filtered. The precipitate was washed successively with methanol and ether and dried to obtain the raw sodium salt of N-(2,4-disulfobenzoyl)-N-desulfoheparin.

This product was purified by passing an aqueous solution of the said salt through a column of a strongly basic anion exchange resin, such as that possessing the functional structure of a quaternary ammonium group and recovering the fraction giving a positive test of precipitation of Hyamine 1622. The column was rinsed with distilled water and the eluates were combined, treated with animal carbon black and filtered. The filtrate was neutralized by the addition of acetic acid and the pH was then adjusted to 7.8 with a sodium hydroxide solution. The said salt was precipitated by the addition of methanol and the precipitate was separated by vacuum filtration, was washed successively with methanol and ether, and dried to obtain 16.7 g. of the sodium salt of N-(2,4-disulfobenzoyl)-N-desulfoheparin.

The product was soluble in water and insoluble in alcohol, ether, acetone, benzene and chloroform.

*Sulphur content:* 12.65% (theory: 14.18%).

*U.V. spectra.*—(In N/10 hydrochloride acid solution).

$\lambda$ max. 221 m$\mu$ $E_{1\,cm.}^{1\%} = 107$ $\lambda$ max. 263 m$\mu$ $E_{1\,cm.}^{1\%} = 11.2$ $\lambda$ max. 270 m$\mu$ $E_{1\,cm.}^{1\%} = 12.4$ $\lambda$ max. 277 m$\mu$ $E_{1\,cm.}^{1\%} = 11.1$

*Anticoagulant activity.*—66.2 ATU/mg.

This compound is not described in the literature.

EXAMPLE III

*Preparation of the sodium salt of N-(3,5-disulfobenzoyl)-N-desulfoheparin*

STEP A.—PREPARATION OF THE MIXED ANHYDRIDE OF 3,5-DISULFOBENZOIC ACID AND ETHOXYCARBONIC ACID

In a 500 cc. conical flask, 3.75 g. of the potassium salt of 3,5-disulfobenzoic acid were dissolved in 50 cc. of distilled water and the pH of the solution was adjusted to 10 by addition of potassium hydroxide. 160 cc. of a 10% solution of Hyamine 1622 were then added and the Hyamine 1622 salt of 3,5-disulfobenzoic acid which precipitated was recovered by filtration. The filter cake was then extracted twice with 100 cc. aliquots of methylene chloride and the extracts were washed with water, dried over sodium sulfate and evaporated to dryness. The residue was redissolved in 30 cc. of tetrahydrofuran and the solution was transferred into a three-necked balloon flask and cooled to between 0 and 5° C. under agitation and an atmosphere of nitrogen. The pH was adjusted to 10 by the addition of 0.1 cc. of triethylamine and then 0.75 cc. of ethylchloroformate were added while agitation was maintained under an atmosphere of nitrogen. At the end of 15 minutes, 1.5 cc. of a 10% solution of triethylamine formate in tetrahydrofuran were added to decompose the excess of ethylchloroformate. There was thus obtained a solution of the mixed anhydride of 3,5-disulfobenzoic acid and formic acid.

STEP B.—PREPARATION OF N-(3,5-DISULFOBENZOYL)-N-DESULFOHEPARIN

To the mixed anhydride solution prepared in Step A there was added a solution of 2 gm. of the Hyamine 1622 salt of N-desulfoheparin, 30 cc. of tetrahydrofuran and 0.5 cc. of triethylamine. The resulting solution was stirred while bubbling in a current of nitrogen and was then evaporated to dryness under vacuum to form an amorphous residue of N-(3,5-disulfobenzoyl) - N - desulfoheparin.

STEP C.—PREPARATION OF THE SODIUM SALT OF N-(3,5-DISULFOBENZOYL)-N-DESULFOHEPARIN

The residue obtained in Step B was dissolved in 30 cc. of butanol saturated with water and this solution was extracted three times with 5 cc. aliquots of a 20% aqueous solution of sodium acetate. The aqueous solution was then filtered and poured into 100 cc. of methanol. The sodium salt of N-(3,5-disulfobenzoyl)-N-desulfoheparin precipitated. This salt was recovered by filtration, was vacuum filtered, washed with methanol containing 20% water and dried to obtain 0.5 to 0.55 g. (55 to 60% yield) of the sodium salt of N-(3,5-disulfobenzoyl)-N-desulfoheparin. The product had an amidification value varying between 82 to 95%.

*U.V. spectra.*—(N/10 hydrochloric acid) inflections at about 270 and 230 m$\mu$ indicating the presence of 0.97 to $1.13 \times 10^{-3}$ mols of 3,5-disulfobenzoic acid per gram equivalent of product (theoretical: $1.18 \times 10^{-3}$/g).

*Anticoagulant activity.*—31±3 ATU/mg. This compound is not described in the literature.

EXAMPLE IV

*Preparation of the sodium salt N-(3-sulfobenzoyl)-N-desulfoheparin*

STEP A.—PREPARATION OF THE HYAMINE 1622 SALT OF M-SULFOBENZOIC ACID

Into a 300 cc. Erlenmeyer flask there were introduced successively 5.2 g. of sodium m-sulfobenzoate, 125 cc. of distilled water and 2.5 cc. of sodium hydroxide solution. The sodium m-sulfobenzoate dissolved rapidly and an alkaline solution having a pH in the neighborhood of 10 was thus obtained. 220 cc. of a 10% aqueous solution of hyamine 1622 were then added and the m-sulfobenzoate of Hyamine 1622 precipitated as an amorphous precipitate. After the precipitate was separated by filtration it was extracted twice with 100 cc. aliquots of methylene chloride and the organic extracts were combined, washed with water, dried over sodium sulfate and evaporated to dryness at atmospheric pressure. The dry residue of the Hyamine 1622 salt of m-sulfobenzoic acid was redissolved in about 50 cc. of tetrahydrofuran. After complete solution the solution was brought to an exact volume of 100 cc. by the addition of more tetrahydrofuran.

STEP B.—PREPARATION OF THE MIXED ANHYDRIDE OF M-SULFOBENZOIC ACID AND ETHOXY CARBONIC ACID

Into a balloon flask having three necks, 50 cc. of the tetrahydrofuran solution of the Hyamine 1622 salt of m-sulfobenzoic acid prepared in Step A were introduced. The mixture was cooled to 5° C.±1 under agitation and under atmosphere of nitrogen and the pH of the solution was adjusted to 10 with triethylamine. Then 1 cc. of redistilled ethylchloroformate was introduced and the temperature of the reaction media mounted slowly and then returned to 5° C. The mixture was maintained for 30 minutes at this temperature and then 3 cc. of a 10% solution of triethylamineformate in tetrahydrofuran were added to obtain a solution of the mixed anhydride of m-sulfobenzoic acid and formic acid.

STEP C.—PREPARATION OF THE SODIUM SALT OF N-(3-SULFOBENZOYL)-N-DESULFOHEPARIN 30 cc. of a tetrahydrofuran solution containing 10% of the Hyamine 1622 salt of N-desulfoheparin were added to the solution of the mixed anhydride of m-sulfobenzoic acid and formic acid. The container which contained the Hyamine 1622 salt of N-desulfoheparin was rinsed with 10 cc. of tetrahydrofuran and the rinse liquids were poured into the reaction mixture. The mixture was agitated for a period of one hour at +5° C. under an atmosphere of nitrogen and the reaction mixture was then evaporated to dryness under vacuum. The amorphous residue of N-(m-sulfobenzoyl)-N-desulfoheparin was redissolved in 50 cc. of butanol saturated with water. The solution of N-(m-sulfobenzoyl) - N - desulfoheparin was then extracted with 10 cc., again 10 cc. and finally 5 cc. of a 20% aqueous solution of sodium acetate. The aqueous phases were combined, decanted, filtered and poured into 100 cc. of methanol. The precipitate was separated by filtration, vacuum filtered, washed and dried to obtain 1.05 g. (75% yield) of the sodium salt of N-(3-sulfobenzoyl)-N-desulfoheparin.

*Analysis.*—Percent NH$_2$, <4% (expressed in N-desulfoheparin). Percent S, 11.5% (theoretical: 11.88%).

*U.V. spectra.*—(N/10 hydrochloric acid):
Inflections $$230 \text{ m}\mu \text{ E}_{1\text{ cm.}}^{1\%} = 79.5$$

$$270 \text{ m}\mu \text{ E}_{1\text{ cm.}}^{1\%} = 6.6$$

This absorption corresponds to $1.06 \times 10^{-3}$ mol of m-sulfobenzoic acid per gram equivalent of product (theoretical: $1.35 \times 10^{-3}$) and the amidification value is thus of the order of 80%.

*Anticoagulant activity.*—29 ATU/mg.

This compound is not described in the literature.

PHARMACOLOGICAL DATA

*Coagulant retardation activity*

The anti-coagulant activity of N-(mono- and disulfobenzoyl)-N-desulfoheparins of the invention was compared with heparin on rabbits. The compounds tested were administered intravenously by injection to the rabbits at doses of 10 mg./kg. and 20 mg./kg. Blood samples were taken at regular intervals 2, 4, 6, 8 and 10 hours after the administration of the compounds and the time of coagulation of the blood determined. The results are summarized in Table I.

TABLE I

| Compound Administered | Anticoagulant Activity | | | |
|---|---|---|---|---|
| | 10 mg./kg. | | 20 mg./kg. | |
| | Number of IU/kg. | Duration of action in hours | Number of IU/kg. | Duration of action in hours |
| Heparin, sodium salt | 1,350 | 4 | 2,700 | 6–7 |
| N-(2-sulfobenzoyl)-N-desulfoheparin, sodium salt | 340 | 6 | 680 | 9 |
| N-(3-sulfobenzoyl)-N-desulfoheparin, sodium salt | ~250 | 3 | | |
| N-(3,5-disulfobenzoyl)-N-desulfoheparin, sodium salt | ~300 | 2 | ~600 | 3 |
| N-(2,4-disulfobenzoyl)-N-desulfoheparin, sodium salt | 220 | 6–7 | 440 | 9–10 |

As can be seen from Table I, the N-(sulfobenzoyl)-N-desulfoheparins of the invention possess a more prolonged anti-coagulant activity at anti-coagulant dosages (expressed in International Units) infinitely less than those of heparin necessary to obtain an effect of the same order.

Various modifications of the process and compositions of the invention may be made without departing from the spirit or scope thereof, and it should be understood that the invention is intended to be limited only as defined in the appended claims.

We claim:

1. A compound selected from the group consisting of N-(mono-sulfobenzoyl)-N-desulfoheparin and N-(di-sulfobenzoyl)-N-desulfoheparin and their alkali metal salts.
2. N-(2-sulfobenzoyl)-N-desulfoheparin.
3. The sodium salt of N-(2-sulfobenzoyl)-N-desulfoheparin.
4. N-(2,4-disulfobenzoyl)-N-desulfoheparin.
5. The sodium salt of N-(2,4-disulfobenzoyl)-N-desulfoheparin.
6. N-(3,5-disulfobenzoyl)-N-desulfoheparin.
7. The sodium salt of N-(3,5-disulfobenzoyl)-N-desulfoheparin.
8. N-(3-sulfobenzoyl)-N-desulfoheparin.
9. The sodium salt of N-(3-sulfobenzoyl)-N-desulfoheparin.
10. A process for the preparation of a compound selected from the group consisting of N - (mono - sulfobenzoyl)-N-desulfoheparin and N-(di - sulfobenzoyl) - N-desulfoheparin which comprises reacting N-desulfoheparin with a high molecular weight quaternary ammonium salt to form the corresponding quaternary ammonium salt of N-desulfoheparin, reacting the latter with an acid anhydride selected from the group consisting of anhydrides of mono-sulfobenzoic acid and disulfobenzoic acid and mixed anhydrides of mono-sulfobenzoic acid and di-sulfobenzoic acid with a lower alkanoic acid to form the desired N-(sulfobenzoyl)-N-desulfoheparin.
11. The process of claim 10 wherein the N-(sulfobenzoyl)-N-desulfoheparin is reacted with an alkali metal salt of a lower alkanoic acid to form the corresponding alkali metal salt of the N-(sulfobenzoyl)-N-desulfoheparin.
12. The process of claim 10 wherein the acid anhydride is the mixed anhydride of m-sulfobenzoic acid and ethoxycarbonic acid.
13. The process of claim 10 wherein the high molecular weight quaternary ammonium salt is benzyl dimethyl-2-[2-(p-1,1,3,3,-tetramethyl-butyl-phenoxy) - ethoxy] - ethyl ammonium chloride.
14. The process of claim 11 wherein the alkali metal salt of a lower alkanoic acid is sodium acetate.
15. Anti-coagulant compositions comprising a compound selected from the group consisting of N-(mono-sulfobenzoyl)-N-desulfoheparin and N-(di-sulfobenzoyl)-N-desulfoheparin and their alkali metal salts and a major amount of a pharmaceutical carrier.
16. Anti-coagulant compositions comprising a compound selected from the group consisting of N-(mono-sulfobenzoyl)-N-desulfoheparin and N-(di-sulfobenzoyl)-N-desulfoheparin and their alkali metals salts and a major amount of a liquid, injectable carrier.
17. The process of claim 10 wherein the acid anhydride is o-sulfobenzoic acid anhydride.
18. The process of claim 10 wherein the acid anhydride is 2,4-disulfobenzoic acid anhydride.
19. The process of claim 10 wherein the acid anhydride is the mixed anhydride of 3,5-disulfobenzoic acid and ethoxycarbonic acid.

References Cited by the Examiner
UNITED STATES PATENTS
3,118,817   1/1964   Nomine _____ 167—74

JULIAN S. LEVITT, *Primary Examiner.*

FRANK CACCIAPAGLIA, Jr., *Examiner.*